United States Patent [19]

Uchida et al.

[11] Patent Number: 4,740,728
[45] Date of Patent: Apr. 26, 1988

[54] CATHODE RAY TUBE

[75] Inventors: Hiroshi Uchida, Odawara; Thihiro Yoshida, Hatano, both of Japan

[73] Assignee: Kasei Optonix, Ltd., Japan

[21] Appl. No.: 679,599

[22] Filed: Dec. 7, 1984

Related U.S. Application Data

[63] Continuation of Ser. No. 541,476, Oct. 14, 1983, abandoned, which is a continuation of Ser. No. 232,181, Feb. 6, 1981, abandoned.

[30] Foreign Application Priority Data

Feb. 7, 1980 [JP] Japan ................................. 55-13967

[51] Int. Cl.$^4$ .......................... C09K 11/30; H01J 29/20
[52] U.S. Cl. ............................... 313/467; 252/301.6 S
[58] Field of Search ................... 252/301.6 S; 313/467

[56] References Cited

U.S. PATENT DOCUMENTS

| | | | |
|---|---|---|---|
| 4,140,940 | 2/1979 | Uehara et al. | 252/301.6 S X |
| 4,316,816 | 2/1982 | Royce et al. | 252/301.6 S |

FOREIGN PATENT DOCUMENTS

| | | | |
|---|---|---|---|
| 49-39586 | 4/1974 | Japan | 252/301.6 S |
| 53-17587 | 2/1978 | Japan | 252/301.6 S |

*Primary Examiner*—Jack Cooper

[57] ABSTRACT

A cathode ray tube having a fluorescent screen of a copper and aluminum activated zinc sulfide phosphor (ZnS:Cu,Al). The ZnS:Cu,Al phosphor has a Cu activator value ranging from $3 \times 10^{-4}$ to $5 \times 10^{-3}$ grams per 1 gram of ZnS; an emission color point within a yellowish green region in the color coordinates of CIE color system represented by values x and y ranging from 0.295 to 0.370 and 0.570 to 0.630, respectively; a color point of body color within a yellow region in the color coordinates of CIE color system represented by values x and y ranging from 0.380 to 0.400 and 0.390 to 0.440, respectively; and a mean reflectance in the visible spectrum region of not less than 75% when the mean reflectance of a magnesium oxide diffusion plate is defined to be 100%.

1 Claim, 6 Drawing Sheets

F I G. I

CATHODE RAY TUBE

This application is a continuation of application Ser. No. 541,476, filed Oct. 14, 1983, which is a continuation of application Ser. No. 232,181, filed Feb. 6, 1981, both now abandoned.

BACKGROUND OF THE INVENTION

1. Field of the Invention

This invention relates to a cathode ray tube, and more particularly to a cathode ray tube having a fluorescent screen of a copper and aluminum activated zinc sulfide phosphor.

2. Description of the Prior Art

As a green emitting phosphor of a fluorescent screen of a color television cathode ray tube (hereinafter referred to as "color TV CRT"), a copper and aluminum activated zinc sulfide phosphor (ZnS:Cu,Al) has heretofore been employed. The ZnS:Cu,Al phosphor has an emission color point within a green region in the color coordinates of CIE color system represented by values x and y ranging from 0.250 to 0.285 and 0.578 to 0.653, respectively.

Recently, there has been a demand for a color TV CRT having high white luminance. To meet the demand, there has been employed a green emitting phosphor having an emission color point within a yellowish green region which is biased to a longer wavelength side than the above-mentioned green region. More concretely, a green emitting phosphor which exhibits yellowish green emission the value x of the color point of which is not less than 0.295 has been employed. As described hereinbelow, the conventional ZnS:Cu,Al phosphor does not exhibit yellowish green emission as mentioned above. Accordingly, as the green emitting phosphor exhibiting a yellowish green emission, there has been employed a mixed phosphor in which a proper amount of the ZnS:Cu,Al green emitting phosphor is mixed with a proper amount of a gold and aluminum activated zinc sulfide yellow emitting phosphor (ZnS:Au,Al) so as to obtain yellowish green emission, or employed a gold, copper and aluminum activated zinc sulfide phosphor (ZnS:Au,Cu,Al) which solely exhibits yellowish green emission.

However, the thermal stability of the abovementioned ZnS:Au,Al and ZnS:Au,Cu,Al phosphors is low. Therefore, when these phosphors are heated to an ordinary baking temperature for the production of a fluorescent screen of a color TV CRT (450°–480° C.), the emission luminance thereof is lowered and the emission spectra thereof are shifted to a shorter wavelength side. Accordingly, when the fluorescent screen employing the above-mentioned mixed phosphor or ZnS:Au,Cu,Al phosphor is prepared, baking must be carried out for a long period of time at a temperature lower than the ordinary baking temperature. Such circumstances result in lowering of operating efficiency and increase in manufacturing cost. Further, since the ZnS:Au,Al phosphor and the ZnS:Au,Cu,Al phosphor need to be fired at a high temperature for a long period of time during the preparation thereof, and besides they contain expensive Au as an activator, the manufacturing cost of these phosphors is very high in comparison with the ZnS:Cu,Al phosphor. Under the above-mentioned circumstances, there is a demand for a green emitting phosphor for a color TV CRT which exhibits yellowish green emission and does not have the above-mentioned defects, and accordingly, can be employed in place of the above-mentioned mixed phosphor or ZnS:Au,Cu,Al phosphor.

ZnS:Cu,Al phosphors do not have the above-mentioned defects of the ZnS:Au,Al phosphor and the ZnS:Au,Cu,Al phosphor. That is, the ZnS:Cu,Al phosphor is stable at the ordinary baking temperature, and therefore, when heated to the temperature, the emission luminance thereof is not lowered and the emission color thereof is not changed. Further, the ZnS:Cu,Al phosphor can easily be prepared in comparison with the ZnS:Au,Al phosphor and the ZnS:Au,Cu,Al phosphor. Furthermore, the ZnS:Cu,Al phosphor is more inexpensive than the ZnS:Au,Al phosphor and the ZnS:Au,Cu,Al phosphor because it does not contain Au. From the above viewpoints, it is desirable to employ the ZnS:Cu,Al phosphor in a color TV CRT having high white luminance in place of the above-mentioned mixed phosphor or ZnS:Au,Cu,Al phosphor. However, as described hereinbelow in detail, the conventional ZnS:Cu,Al phosphor does not exhibit yellowish green emission, and accordingly, there is a great demand for a ZnS:Cu,Al phosphor which exhibits yellowish green emission.

As a phosphor exhibiting yellowish green emission, has been known a copper and aluminum activated zinc cadmium sulfide phosphor [(Zn,Cd)S:Cu,Al] which was practically used as a green emitting phosphor of a color TV CRT before the practical use of the conventional ZnS:Cu,Al phosphor. However, since the (Zn,Cd)S:Cu,Al phosphor contains cadmium which is very toxic to the human body, it is desirable not to practically use the (Zn,Cd)S:Cu,Al phosphor from the viewpoint of prevention of environmental pollution.

The conventional ZnS:Cu,Al phosphor can be prepared by mixing a proper amount of raw materials of Cu and Au activators with a powdery zinc sulfide (ZnS) precipitated from a zinc ion-containing aqueous solution to obtain a raw material mixture, and then firing the raw material mixture in a reducing atmosphere such as a carbon vapor atmosphere and a hydrogen sulfide atmosphere at a temperature within the range of 800° to 1200° C. Generally, a proper amount of sulfur is added to the raw material mixture in order to prevent oxidization of the ZnS. Further, a proper amount of flux is generally added to the raw material mixture in order to, for example, enhance the emission luminance of the ZnS:Cu,Al phosphor obtained. The emission color of the ZnS:Cu,Al phosphor prepared in accordance with the above-mentioned process depends upon the Cu activator value. However, no matter how the Cu activator value may be altered, value x of the emission color point of the ZnS:Cu,Al phosphor obtained is not more than 0.285. Accordingly, a ZnS:Cu,Al phosphor which exhibits yellowish green emission the value x of the color point of which is not less than 0.295 cannot be prepared in accordance with the above-mentioned process. In FIG. 1, curves c and d show the relationships between the Cu activator value of the conventional ZnS:Cu,Al phosphor and the values x and y of the emission color point of the phosphor, respectively. As is clear from the curve c, when the Cu activator value is less than about $2 \times 10^{-4}$ grams per 1 gram of ZnS (Similarly, the Cu activator value and Al activator value described hereinafter are represented by the number of grams per 1 gram of ZnS), value x of the emission color point increases as the Cu activator value increases. When the Cu activator value is about $2 \times 10^{-4}$ g/g, value x becomes maximum (x=0.285), and when the Cu activator value is more than about $2\times 10^{-4}$ g/g, value x gradually decreases as the Cu activator value increases. On the other hand, as is clear from the curve d, value y of the emission color point gradually decreases as the Cu activator value increases. In the region extending from green to yellow of the color coordinates of CIE color system, the change of value x much more contributes to the change of color than the change of value y. Therefore, the emission color of the conventional ZnS:Cu,Al phosphor gradually shifts to a longer wavelength side as the Cu activator value increases when it is less than about $2\times 10^{-4}$ g/g, have the longest wavelength when the Cu activator value is about $2\times 10^{-4}$ g/g, and gradually shifts to a shorter wavelength side as the Cu activator value increases when it is more than about $2\times 10^{-4}$ g/g. As described above, the conventional ZnS:Cu,Al phosphor has an emission color point within a green region having value x of not more than 0.285. Accordingly, value x of more than 0.285 cannot be attained by the conventional ZnS:Cu,Al phosphor.

The Cu activator value also has an effect upon the emission luminance of the ZnS:Cu,Al phosphor. In FIG. 2, curve b shows the relationship between the Cu activator value of the conventional ZnS:Cu,Al phosphor and the emission luminance of the phosphor. As is clear from the curve b, when the Cu activator value is not less than $10^{-4}$ g/g, the emission luminance lowers as the Cu activator value increases. In particular, when the Cu activator value becomes not less than $5\times 10^{-4}$ g/g, the emission luminance falls prominently. Since the body color of the ZnS:Cu,Al phosphor changes from white to gray as the Cu activator value increases, it is consider that the above fall of the emission luminance is based on the fact as follows. That is, as the Cu activator value increases, the amount of Cu not taken into the ZnS host material crystal increases and there is deposited on the surface of the phosphor particles a black copper sulfide which absorbs the light emitted from the phosphor. In FIG. 3, curves c and d show the relationships between the Cu activator value of the conventional ZnS:Cu,Al phosphor and the values x and y of the color point of body color of the phosphor, respectively. Further, in FIG. 4, curve b shows the relationship between the Cu activator value of the conventional ZnS:Cu,Al phosphor and the mean reflectance in the visible spectrum region of the phosphor. As is clear from curves c and d in FIG. 3, the color point of the body color of the conventional ZnS:Cu,Al phosphor lies within a white region in the color coordinates of CIE color system. Further, as is clear from the curve b in FIG. 4, the reflectance of the conventional ZnS:Cu,Al phosphor gradually lowers as the Cu activator value increases. That is, the conventional ZnS:Cu,Al phosphor has a white body color when the Cu activator value is small. However, as the Cu activator valve increases, the body color gradually changes from white to gray and the reflectance of the phosphor gradually lowers.

Based on the relationship between the Cu activator value of the conventional ZnS:Cu,Al phosphor and the emission color of the phosphor (curves c and d in FIG. 1), and the relationship between the Cu activator value of the conventional ZnS:Cu,Al phosphor and the emission luminance of the phosphor (curve b in FIG. 2) as described above, the ZnS:Cu,Al green emitting phosphor in which the Cu activator value is within the range of $10^{-5}$ to $3\times 10^{-4}$ g/g, and values x and y are within the ranges 0.25 to 0.285 and 0.578 to 0.653, respectively, has heretofore been practically used as a green emitting phosphor of a fluorescent screen of a color TV CRT. Such a ZnS:Cu,Al phosphor, for example, is disclosed in U.S. Pat. No. 4,038,205. That is, the patent discloses ZnS:Cu,Al green emitting phosphor employed as a green emitting phosphor of a fluorescent screen of a color TV CRT in which the Cu activator value is within the range of $10^{-5}$ to $2\times 10^{-4}$ g/g, and values x and y are within the ranges of 0.250 to 0.280 and 0.560 to 0.615, respectively. In the conventional ZnS:Cu,Al phosphor, the Al activator value is generally ½ to 7 times as large as the Cu activator value.

As explained above, the conventional ZnS:Cu,Al phosphor does not exhibit yellowish green emission. However, as described above, the ZnS:Cu,Al phosphor is more stable at a baking temperature usually employed in production of a fluorescent screen of a color TV CRT and is more inexpensive than the above-mentioned mixed phosphor or ZnS:Au,Cu,Al phosphor which exhibits yellowish green emission and at present, is practically used as a green emitting phosphor for a color TV CRT having high white luminance. Accordingly, there is a great demand for ZnS:Cu,Al phosphor which exhibits yellowish green emission of high luminance. Further, there is a great demand for a color TV CRT having a fluorescent screen in which such a ZnS:Cu,Al phosphor is employed as a green emitting phosphor.

SUMMARY OF THE INVENTION

Therefore, an object of the present invention is to provide a cathode ray tube, particularly a color TV CRT, having a fluorescent screen of ZnS:Cu,Al phosphor which exhibits yellowish green emission of high luminance.

In order to accomplish the above object, the inventors of the present invention conducted various investigations in the ZnS:Cu,Al phosphor. As the result of the investigations, it was found that the ZnS:Cu,Al phosphor which exhibited yellowish green emission of high luminance and had a yellow body color of high reflectance when the Cu activator value was within the range of $3\times 10^{-4}$ to $5\times 10^{-3}$ g/g could be obtained by the following process. That is, the phosphor can be obtained in the process of preparation of a ZnS:Cu,Al phosphor by using, as the raw material of the ZnS host material, powdery ZnS precipitated from a zinc ion-containing aqueous solution having a pH value of not more than 3, and by adding solid hydrogen sulfide having a form of an organic material with a hydrogen sulfide adsorbed thereon to the raw material mixture of the ZnS:Cu,Al phosphor.

The cathode ray tube of the present invention has a fluorescent screen comprising ZnS:Cu,Al phosphor which has a Cu activator value ranging from $3\times 10^{-4}$ to $5\times 10^{-3}$ g/g; an emission color point within a yellowish green region in the color coordinates of CIE color system represented by values x and y ranging from 0.295 to 0.370 and 0.570 to 0.630, respectively; a color point of body color within a yellow region in the color coordinates of CIE color system represented by values x and y ranging from 0.380 to 0.400 and 0.390 to 0.440, respectively; and a mean reflectance in the visible spectrum region of not less than 75% when the mean reflectance of a magnesium oxide diffusion plate is defined to be 100%.

DETAILED DESCRIPTION OF THE INVENTION

Figure 1:
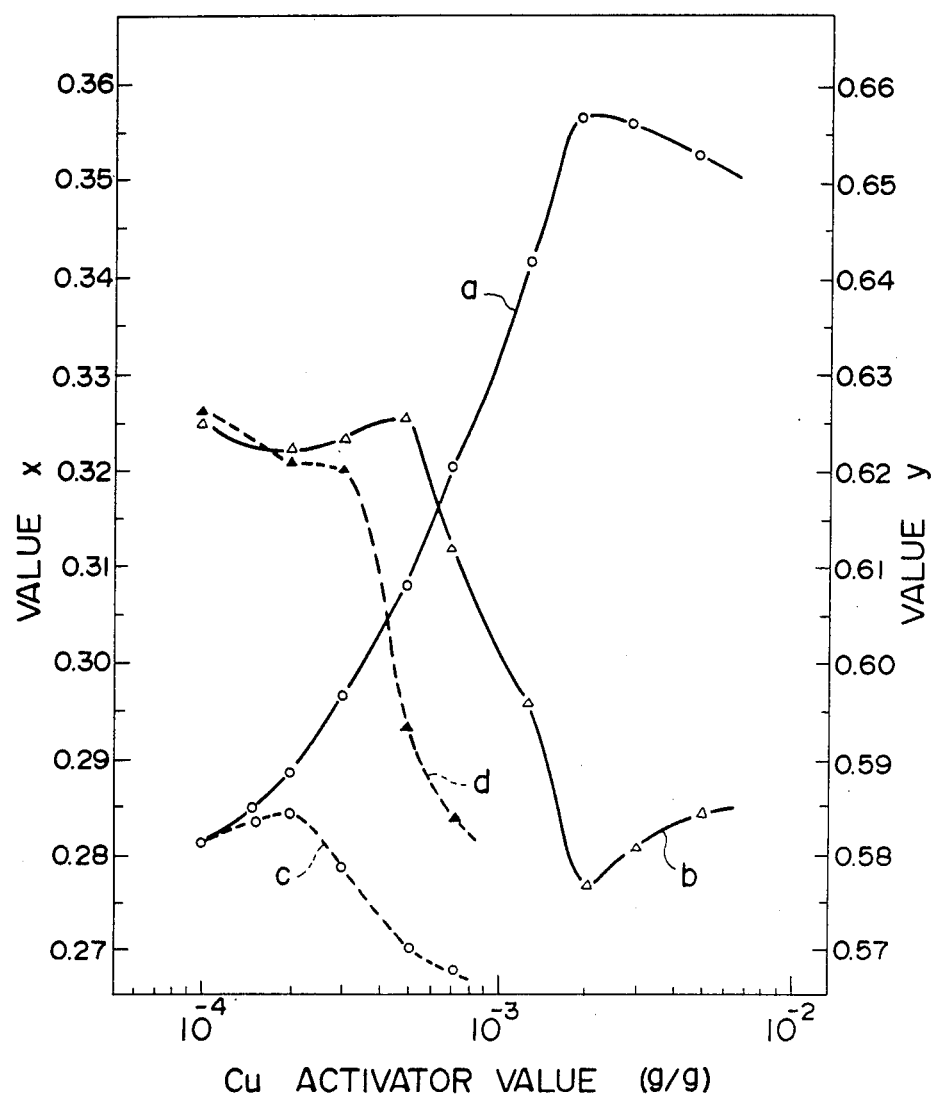
FIG. 1 is a graph showing the relationships between the Cu activator value of the ZnS:Cu,Al phosphor employed in the cathode ray tube of the present invention and the values x and y of the color point of the phosphor (curves a and b, respectively) in comparison with those in the conventional ZnS:Cu,Al phosphor (curves c and d)

The present invention will hereinbelow be described in detail.

The ZnS:Cu,Al phosphor employed in the cathode ray tube in accordance with the present invention is prepared by the following process.

First of all, powdery ZnS is precipitated from a zinc ion-containing aqueous solution having a pH value of not more than 3. Generally, the formation of the powdery ZnS is performed by adjusting the pH value of an aqueous solution of a zinc compound such as zinc sulfate, zinc nitrate, and the like, and then causing hydrogen sulfide to blow into the solution. The powdery ZnS is separated from the solution by filtration, washed with water and dried. Then, a raw material of Cu activator, a raw material of Al activator and solid hydrogen sulfide are added in a proper amount to the powdery ZnS and mixed thoroughly therewith by means of a mortar, a ball mill, or the like to obtain a raw material mixture. As the raw material of Cu activator, a copper compound such as copper nitrate, copper sulfate, copper chloride, and the like can be employed. The raw material of Cu activator is added to the powdery ZnS in such an amount that the amount of Cu is within the range of $3 \times 10^{-4}$ to $5 \times 10^{-3}$ grams per 1 gram of the powdery ZnS. As the raw material of Al activator, an aluminum compound such as aluminum sulfate, aluminum nitrate, aluminum acetate, and the like can be employed. Generally, the Al activator value is $\frac{1}{2}$ to 7 times as large as of the Cu activator value. Solid hydrogen sulfide is composed of an organic material (substrate) and hydrogen sulfide adsorbed on the organic material, and is widely marketed. For example, solid hydrogen sulfide in which paraffin is used as the substrate is marketed by Kanto Kagaku Co., Ltd. Solid hydrogen sulfide does not remain at all in the phosphor obtained, because during the firing step described hereinbelow, the organic substrate thereof is decomposed and vaporized and the hydrogen sulfide adsorbed on the substrate is also vaporized. Although the amount of the solid hydrogen sulfide employed is determined depending upon the amount of the hydrogen sulfide contained therein, the kind of the organic substrate employed therein, the firing conditions used and so forth, it is generally within the range of 0.05 to 5% by weight of the powdery ZnS. Generally, sulfur is added to the raw material mixture in a proper amount in order to prevent oxidization of the ZnS. Further a flux is generally added to the raw material mixture in a proper amount in order to, for example, enhance the emission luminance of the phosphor obtained. As the flux, for instance, halides of alkali metals, alkaline earth metals, bismuth, and lead can be employed.

Then, the raw material mixture is put into a heat-resistant container such as a quartz crucible, an alumina crucible, or the like and fired. The firing is performed in a reducing atmosphere such as a carbon vapor atmosphere and a hydrogen sulfide atmosphere at a temperature within the range of 800° to 1200° C. Although the firing period is determined depending upon the amount of the raw material mixture charged in the heat-resistant container, the firing temperature employed and so forth, it is generally within the range of 0.5 to 6 hours. After the firing, the fired product obtained is pulverized. Then, the pulverized fired product is subjected to the processes generally employed in production of a phosphor, such as washing, drying and sieving to obtain the ZnS:Cu,Al phosphor employed in the cathode ray tube of the present invention.

The ZnS:Cu,Al phosphor used in the CRT of this invention prepared in accordance with the above-mentioned novel process (hereinafter referred to as "present phosphor") has a Cu activator value ranging from $3 \times 10^{-4}$ to $5 \times 10^{-3}$ g/g and an emission color point within a yellowish green region represented by values x and y ranging from 0.295 to 0.370 and 0.570 to 0.630, respectively. Such a ZnS:Cu,Al phosphor exhibiting yellowish green emission has not heretofore been known. In the conventional ZnS:Cu,Al phosphor having a Cu activator value with the above range, the emission luminance falls markedly as the Cu activator value increases. Differently from this, in the present phosphor, the degree of fall of the emission luminance caused by the increase of the Cu activator value is very low. Further, the body color of the conventional ZnS:Cu,Al phosphor having a Cu activator value within the above range is gray. Differently from this, the present phosphor has a yellow body color of high reflectance. That is, the color point of the body color of the present phosphor lies within a yellow region represented by values x and y ranging from 0.380 to 0.400 and 0.390 to 0.440, respectively.

FIG. 1 is a graph showing the relationships between the Cu activator value of the present phosphor and the values x and y of the emission color point of the phosphor (curves a and b, respectively) in comparison with those in the conventional ZnS:Cu,Al phosphor (curves c and d). As is clear from FIG. 1, the value x of the emission color point of the conventional ZnS:Cu,Al phosphor (curve c) becomes maximum (x=0.285) when the Cu activator value is about $2\times10^{-4}$ g/g, and it decreases gradually as the Cu activator value increases when the Cu activator value is more than about $2\times10^{-4}$ g/g. That is, value x of not less than 0.295 cannot be attained by the conventional ZnS:Cu,Al phosphor, and thus the conventional ZnS:Cu,Al phosphor does not exhibit yellowish green emission no matter how the Cu activator value thereof is altered. In contrast to this, the value x of the emission color point of the present phosphor having a Cu activator value within the range of $3\times10^{-4}$ to $5\times10^{-3}$ g/g (curve a) is not less than 0.295. The value x increases as the Cu activator value increases when the Cu activator value is less than about $2\times10^{-3}$ g/g, it becomes maximum (x=0.357) when the Cu activator value is about $2\times10^{-3}$ g/g, and it decreases gradually as the Cu activator value increases when the Cu activator value is more than about $2\times10^{-3}$ g/g. That is, the present phosphor exhibits yellowish green emission which is not attainable by the conventional ZnS:Cu,Al phosphor. Although the emission color point of the present phosphor varies to some extent depending upon the manufacturing conditions, it lies in a yellowish green region represented by values x and y ranging from 0.295 to 0.370 and 0.570 to 0.630, respectively.

Figure 2:
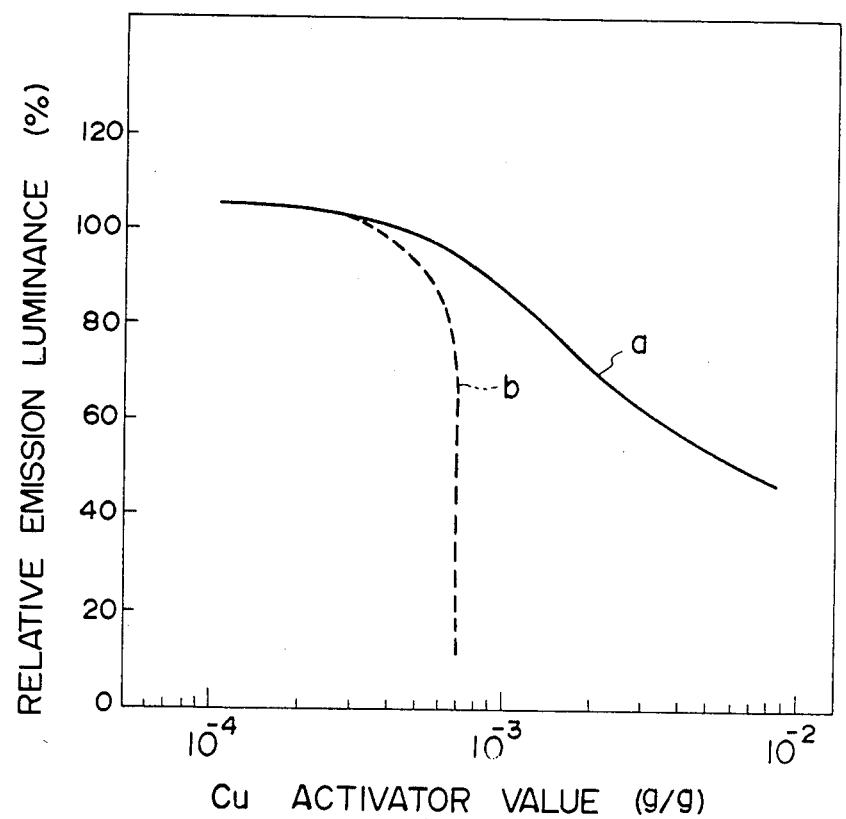
FIG. 2 is a graph showing the relationship between the Cu activator value of the ZnS:Cu,Al phosphor employed in the cathode ray tube of the present invention and the emission luminance of the phosphor (curve a) in comparison with that in the conventional ZnS:Cu,Al phosphor (curve b)

FIG. 2 is a graph showing the relationship between the Cu activator value of the present phosphor and the emission luminance thereof (curve a) in comparison with that in the conventional ZnS:Cu,Al phosphor (curve b). As is clear from FIG. 2, although in both the ZnS:Cu,Al phosphors, the emission luminance falls as the Cu activator value increases, the degree of the fall of the emission luminance caused by the increase of the Cu activator value in the present phosphor is much lower than that in the conventional ZnS:Cu,Al phosphor, and the present phosphor maintains sufficiently high emission luminance to practically use the phosphor as a green emitting phosphor of a fluorescent screen of a color TV CRT.

From the viewpoint of emission color and luminance, the present phosphor preferably has a Cu activator value within the range of $4\times10^{-4}$ to $3\times10^{-3}$ g/g. The phosphor has an emission color point within a yellowish green region represented by values x and y ranging from 0.300 to 0.370 and 0.570 to 0.630, respectively, and is more suitable for a green emitting phosphor of a fluorescent screen of a color TV CRT.

Figure 3:
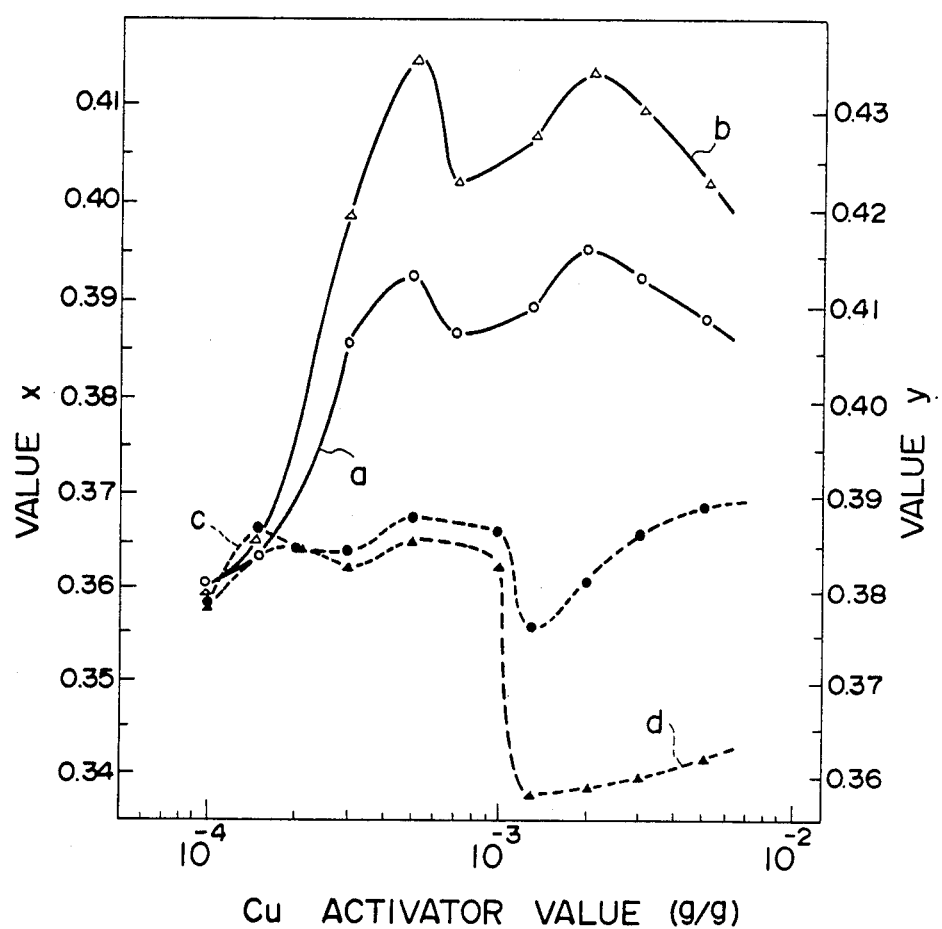
FIG. 3 is a graph showing the relationships between the Cu activator value of the ZnS:Cu,Al phosphor employed in the cathode ray tube of the present invention and the values x and y of the color point of the body color of the phosphor (curves a and b, respectively) in comparison with those in the conventional ZnS:Cu,Al phosphor (curves c and d)
Figure 4:
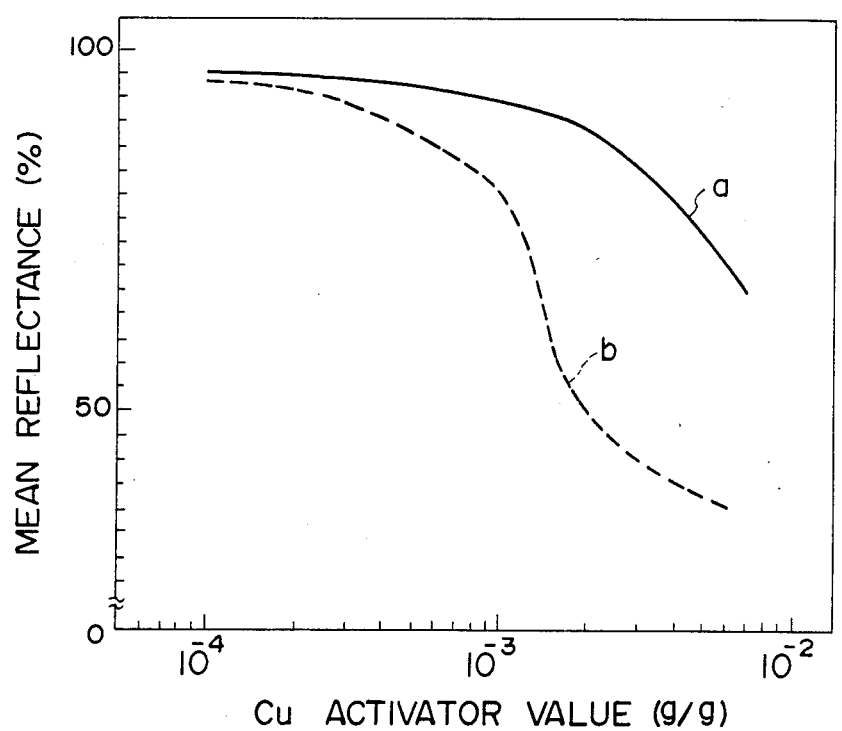
FIG. 4 is a graph showing the relationship between the Cu activator value of the ZnS:Cu,Al phosphor employed in the cathode ray tube of the present invention and the mean reflectance in the visible spectrum region of the phosphor (curve a) in comparison with that in the conventional ZnS:Cu,Al phosphor (curve b)

FIG. 3 is a graph showing the relationships between the Cu activator value of the present phosphor and the values x and y of the color point of body color of the phosphor (curves a and b, respectively) in comparison with those in the conventional ZnS:Cu,Al phosphor (curves c and d). Further, FIG. 4 is a graph showing the relationship between the Cu activator value of the present phosphor and the mean reflectance in the visible spectrum region of the phosphor (curve a) in comparison with that in the conventional ZnS:Cu,Al phosphor (curve b). In FIG. 4, the mean reflectance on the ordinate is represented by a relative value with respect to the mean reflectance of a magnesium oxide diffusion plate defined to be 100%. As is clear from curves c and d in FIG. 3, the color point of body color of the conventional ZnS:Cu,Al phosphor lies in a white region. Further, as is clear from curve b in FIG. 4, the mean reflectance of the conventional ZnS:Cu,Al phosphor falls gradually as the Cu activator value increases. That is, the conventional ZnS:Cu,Al phosphor exhibits a gray body color at a high Cu activation value. In contrast to this, as is clear from curves a and b in FIG. 3, the present phosphor has a yellow body color. Further, as is clear from curve a in FIG. 4, the degree of the fall of the mean reflectance caused by the increase of the Cu activator value in the present phosphor is very low in comparison with that in the conventional ZnS:Cu,Al phosphor. Although the color point of body color of the present phosphor varies to some extent depending upon the manufacturing conditions, it lies within a yellow region represented by values x and y ranging from 0.380 to 0.400 and 0.390 to 0.440, respectively. The ZnS:Cu,Al phosphor having such a body color has not heretofore been known, and the present phosphor is also clearly distinguished from the conventional ZnS:Cu,Al green emitting phosphor by the body color. Further, as shown by the curve a in FIG. 4, the present phosphor has a mean reflectance of not less than 75%.

As described above, differently from the conventional ZnS:Cu,Al phosphor, the present phosphor has a yellow body color of high reflectance. It is considered that this is because, in accordance with the novel process described above, Cu is completely taken into the ZnS host material crystal even at a high Cu activator value and as the result, differently from the case of the conventional ZnS:Cu,Al phosphor, copper sulfide is not deposited on the surface of the phosphor particles. Further, the reason why the present phosphor exhibits emission properties (emission color and emission luminance) different from those of the conventional ZnS:Cu,Al phosphor as shown in FIGS. 1 and 2 is considered as follows. That is, Cu is completely taken into the ZnS host material crystal as described above and as the result, there is formed a phosphor having a structure different from that of the conventional ZnS:Cu,Al phosphor.

Similarly to the conventional ZnS:Cu,Al phosphor, the present phosphor has good thermal stability. Accordingly, differently from the case of above-mentioned mixed phosphor or ZnS:Au,Cu,Al phosphor which is, at present, practically used in a color TV CRT having high white luminance, the emission luminance of the present phosphor does not fall and the emission color thereof does not change during baking when a fluorescent screen is prepared therefrom. Further, the manufacturing cost (including the raw material cost) of the present phosphor is more inexpensive than that of the above-mentioned mixed phosphor or ZnS:Cu,Al phosphor. Furthermore, in general, the emission luminance before baking of the present phosphor is essentially the same as, or higher than that of the above-mentioned mixed phosphor or ZnS:Au,Cu,Al phosphor. Accordingly, in the production of the color TV CRT of the present invention having a fluorescent screen containing the present phosphor as a green emitting phosphor, the baking in the preparation of the fluorescent screen can be performed more easily than in the production of the conventional color TV CRT having a fluorescent screen containing the above-mentioned mixed phosphor or ZnS:Au,Cu,Al phosphor as a green emitting phosphor. Further, the color TV CRT of the present invention can be produced at a lower cost than the conventional color TV CRT. Furthermore, the green luminance of the color TV CRT of the present invention is generally higher than that of the conventional color TV CRT.

Figure 5:
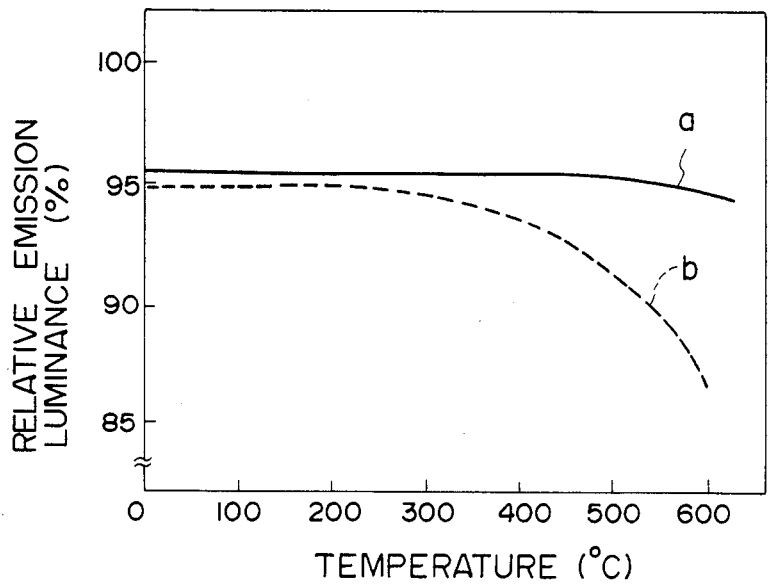
FIG. 5 is a graph showing the thermal stability of the ZnS:Cu,Al phosphor employed in the cathode ray tube of the present invention (curve a) in comparison with that of the conventional ZnS:Au,Cu,Al phosphor (curve b)

FIG. 5 is a graph showing the thermal stability of the present phosphor (curve a) in comparison with that of the ZnS:Au,Cu,Al phosphor (curve b). The data shown in FIG. 5 were obtained by heating each phosphor at each temperature shown on the abscissa for 2 hours, and then measuring the emission luminance of each phosphor. The emission luminance before the heating of each phosphor is shown on the ordinate. The present phosphor had essentially the same emission luminance as that of the ZnS:Au,Cu,Al phosphor used in the test. As is clear from FIG. 5, the ZnS:Au,Cu,Al phosphor is stable at a temperature below about 300° C. However, when the ZnS:Au,Cu,Al phosphor is heated at a temperature not less than about 300° C., the emission luminance thereof falls. In contrast to this, the present phosphor is stable at a temperature below about 600° C., and the fall of the emission luminance thereof is not observed when the phosphor is heated at a temperature below about 600° C. In the preparation of a fluorescent screen of a color TV CRT, baking must be performed at a temperature of not less than 400° C. in order to decompose and remove a binder contained in a coating of a phosphor dispersion. From the viewpoint of operating efficiency and so forth, the baking is ordinarily performed at a temperature ranging from 450° to 480° C. As is clear from FIG. 5, the present phosphor is stable at the ordinary baking temperature and the emission luminance thereof does not fall at the temperature.

Figure 6:
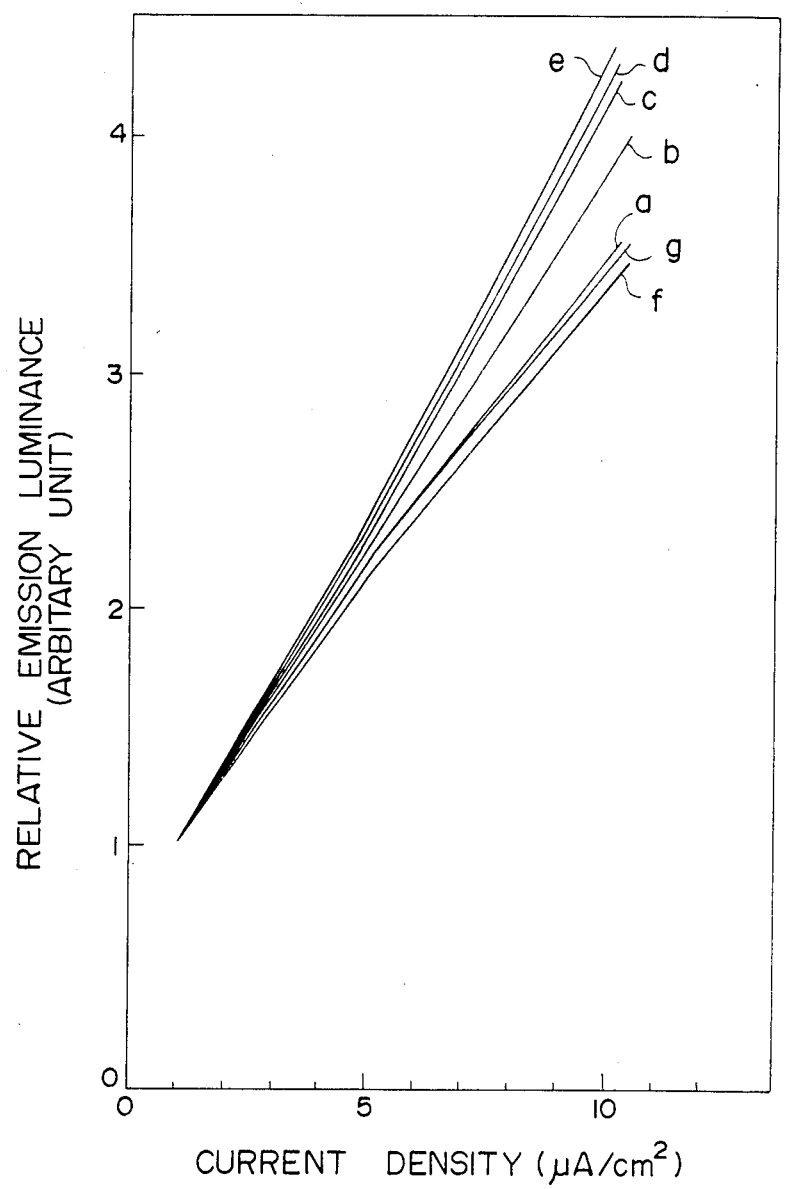
FIG. 6 is a graph showing the current density-emission luminance characteristics of the ZnS:Cu,Al phosphor employed in the cathode ray tube of the present invention (curves a, b, c, d and e) in comparison with those of the conventional ZnS:Cu,Al phosphor (curves f and g)

Further, the current density-emission luminance characteristics of the present phosphor are better than that of the conventional ZnS:Cu,Al phosphor. FIG. 6 is a graph showing current density-emission luminance characteristics of the present phosphor and the conventional ZnS:Cu,Al phosphor. In FIG. 6, curves a, b, c, d and e are of the cases of the present phosphors having Cu activator values of $5 \times 10^{-4}$, $7 \times 10^{-4}$, $1.3 \times 10^{-3}$, $2 \times 10^{-3}$ and $3 \times 10^{-3}$ g/g, respectively, and curves f and g are of the cases of the conventional ZnS:Cu,Al phosphors having Cu activator values of $10^{-4}$ and $3 \times 10^{-4}$ g/g, respectively. As is clear from FIG. 6, the current density-emission luminance characteristics of the present phosphor is better than that of the conventional ZnS:Cu,Al phosphor. In particular, the present phosphor having a Cu activator value ranging from $6.5 \times 10^{-4}$ to $5 \times 10^{-3}$ g/g has excellent current density-emission luminance characteristics.

As easily understood from the above, the current density-green luminance characteristics of the color TV CRT of the present invention having a fluorescent screen containing the present phosphor as a green emitting phosphor is better than that of the color TV CRT having a fluorescent screen containing the conventional ZnS:Cu,Al phosphor as a green emitting phosphor. The green luminance of the color TV CRT of the present invention can markedly be enhanced by increasing the current density of the green emitting phosphor.

As is clear from the above description, the present invention particularly is directed to a color TV CRT having a fluorescent screen containing the present phosphor as a green emitting phosphor. However, the cathode ray tube of the present invention is not limited to a color TV CRT. For example, the cathode ray tube of the present invention may be of the type having two or one color component, such as a monochromatic cathode ray tube having a fluorescent screen consisting of the present phosphor. The color TV CRT of the present invention may be a high contrast color TV CRT in which at least one of red, green and blue emitting phosphors is coated with pigment particles. In the high contrast color TV CRT of the present invention, the red and blue emitting phosphors thereof are generally coated with pigment particles. However, it is not necessary to coat the green emitting phosphor, viz., the present phosphor with pigment particles because the present phosphor itself has a yellow body color.

The cathode ray tube of the present invention is produced by the conventional process employing the present phosphor in the fluorescent screen thereof. The fluorescent screen of the cathode ray tube of the present invention is prepared by the conventional process such as a slurry method.

The present invention will hereinbelow be described referring to several examples.

EXAMPLE 1

A proper amount of concentrated sulfuric acid was added to a zinc sulfate aqueous solution to adjust the pH value of the solution to 1.2. Then, hydrogen sulfide was caused to blow into the solution to precipitate powdery ZnS. The powdery ZnS was separated by filteration, washed with water, and then dried. To 200 grams of the powdery ZnS thus obtained, the following raw materials and additives were added in the indicated amount and mixed thoroughly therewith to obtain a mixture:

| Copper nitrate | $Cu(NO_3)_2 \cdot 3H_2O$ | 1.52 grams |
|---|---|---|
| Aluminum acetate | $Al_2O(CH_3COO)_4 \cdot 4H_2O$ | 2.8 grams |
| Bismuth iodide | $BiI_3$ | 0.2 grams |
| Sulfur | S | 2.0 grams |
| Solid hydrogen sulfide | | 0.6 grams |

The solid hydrogen sulfide employed was one marketed by Kanto Kagaku Co., Ltd. The solid hydrogen sulfide was composed of paraffin and hydrogen sulfide adsorbed thereon in the ratio of 2.8 liters of the hydrogen sulfide per 100 grams of the paraffin.

Then, the mixture obtained was placed in an alumina crucible and fired in an electric furnace. The firing was performed at a temperature of 1000° C. for 2 hours in a carbon vapor atmosphere. After the firing, the fired product was taken out of the furnace, cooled, pulverized, washed with water, and then dried. Thus, the ZnS:Cu,Al phosphor having Cu and Al activator value each of $2 \times 10^{-3}$ g/g was obtained.

Figure 7:
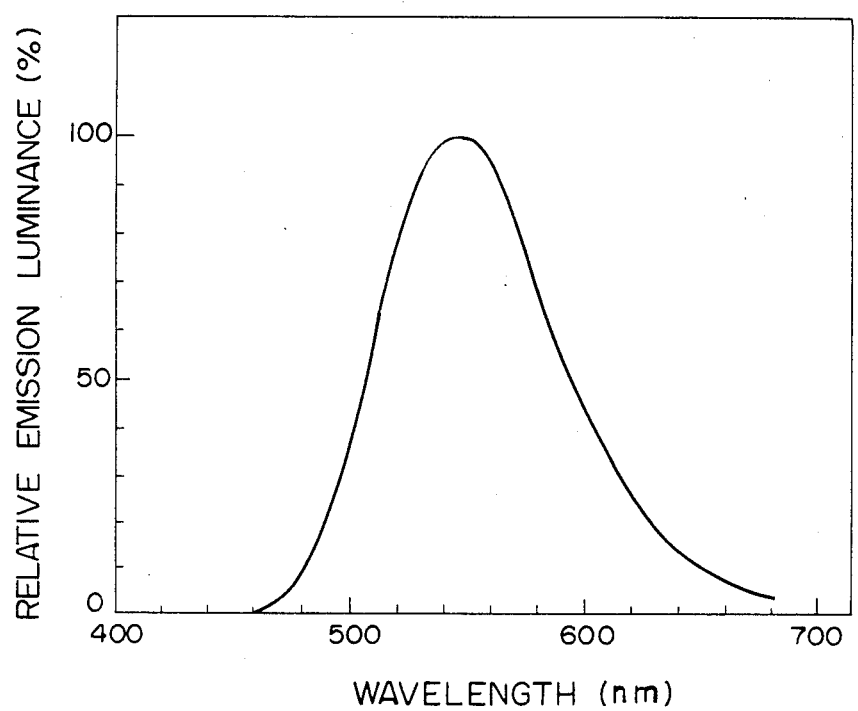
FIG. 7 is a graph showing the emission spectrum of the ZnS:Cu,Al phosphor employed in the cathode ray tube of the present invention.

The ZnS:Cu,Al phosphor exhibited yellowish green emission of high luminance. The emission spectrum of the phosphor had an emission peak at 544 nm. The emission spectrum thereof is shown in FIG. 7. The values x and y of the emission color point of the phosphor were 0.357 and 0.577, respectively. Further, the phosphor had a yellow body color. The values x and y of the color point of body color of the phosphor were 0.395 and 0.434, respectively. The mean reflectance in the visible spectrum region of the phosphor was 90%.

Then, a color TV CRT having a fluorescent screen containing the above ZnS:Cu,Al phosphor as a green emitting phosphor was produced by the conventional process. As the red and blue emitting phosphors constituting the fluorescent screen of the color TV CRT, an europium activated yttrium oxysulfide phosphor ($Y_2O_2S:Eu$) and a silver activated zinc sulfide phosphor (ZnS:Ag) were employed, respectively. Upon the production of the color TV CRT, the baking in the preparation of the fluorescent screen was performed at a temperature of 460° C. for 2 hours. The emission luminance and the emission color of the ZnS:Cu,Al phosphor constituting the fluorescent screen of the color TV CRT obtained were essentially the same as those of the ZnS:Cu,Al phosphor before the preparation of the fluorescent screen.

| Powdery zinc sulfide (same as Example 1) | ZnS | 200 grams |
|---|---|---|
| Copper nitrate | $Cu(NO_3)_2.3H_2O$ | 0.99 grams |
| Aluminum acetate | $Al_2O(CH_3COO)_4.4H_2O$ | 1.82 grams |
| Bismuth iodide | $BiI_3$ | 0.2 grams |
| Sulfur | S | 2.0 grams |
| Solid hydrogen sulfide (same as Example 1) | | 0.6 grams |

Employing the above raw materials and additives in the indicated amount, a ZnS:Cu,Al phosphor having Cu and Al activator value each of $1.3 \times 10^{-3}$ g/g was prepared in the same manner as described in Example 1. The ZnS:Cu,Al phosphor obtained exhibited yellowish green emission of high luminance. The emission spectrum of the phosphor had an emission peak at 538 nm and the values x and y of the emission color point of the phosphor were 0.341 and 0.596, respectively. Further, the phosphor had a yellow body color and the values x and y of the color point of body color of the phosphor were 0.389 and 0.426, respectively. The mean reflectance in the visible spectrum region of the phosphor was 92%.

Then, a color TV CRT having a fluorescent screen containing the above ZnS:Cu,Al phosphor as a green emitting phosphor was produced in the same manner as described in Example 1. Both the emission luminance and the emission color of the ZnS:Cu,Al phosphor constituting the fluorescent screen of the color TV CRT obtained were essentially the same as those of the ZnS:Cu,Al phosphor before the preparation of the fluorescent screen.

| Powdery zinc sulfide (same as Example 1) | ZnS | 200 grams |
|---|---|---|
| Copper nitrate | $Cu(NO_3)_2.3H_2O$ | 0.38 grams |
| Aluminum acetate | $Al_2O(CH_3COO)_4.4H_2O$ | 0.7 grams |
| Bismuth iodide | $BiI_3$ | 0.2 grams |
| Sulfur | S | 2.0 grams |
| Solid hydrogen sulfide (same as Example 1) | | 0.5 grams |

Employing the above raw materials and additives in the indicated amount, a ZnS:Cu,Al phosphor having Cu and Al activator value each of $5 \times 10^{-4}$ g/g was prepared in the same manner as described in Example 1. The ZnS:Cu,Al phosphor obtained exhibited yellowish green emission of high luminance. The emission spectrum of the phosphor had an emission peak at 534 nm and the values x and y of the emission color point of the phosphor were 0.308 and 0.625, respectively. Further, the phosphor had a yellow body color and the values x and y of the color point of body color of the phosphor were 0.393 and 0.435, respectively. The mean reflectance in the visible spectrum region of the phosphor was 95%.

Then, a color TV CRT having a fluorescent screen containing the above ZnS:Cu,Al phosphor as a green emitting phosphor was produced in the same manner as described in Example 1. Both the emission luminance and the emission color of the ZnS:Cu,Al phosphor constituting the fluorescent screen of the color TV CRT obtained were essentially the same as those of the ZnS:Cu,Al phosphor before the preparation of the fluorescent screen.

| Powdery zinc sulfide (same as Example 1) | ZnS | 200 grams |
|---|---|---|
| Copper nitrate | $Cu(NO_3)_2.3H_2O$ | 0.53 grams |
| Aluminum acetate | $Al_2O(CH_3COO)_4.4H_2O$ | 0.98 grams |
| Bismuth iodide | $BiI_3$ | 0.2 grams |
| Sulfur | S | 2.0 grams |
| Solid hydrogen sulfide (same as Example 1) | | 0.5 grams |

Employing the above raw materials and additives in the indicated amount, a ZnS:Cu,Al phosphor having Cu and Al activator value each of $7 \times 10^{-4}$ g/g was prepared in the same manner as described in Example 1. The ZnS:Cu,Al phosphor obtained exhibited yellowish green emission. The emission spectrum of the phosphor had an emission peak at 536 nm and the values x and y of the emission color point of the phosphor were 0.320 and 0.611, respectively. Further, the phosphor had a yellow body color and the values x and y of the color point of body color of the phosphor were 0.387 and 0.422, respectively. The mean reflectance in the visible spectrum region of the phosphor was 93%.

Then, a color TV CRT having a fluorescent screen containing the above ZnS:Cu,Al phosphor as a green emitting phosphor was produced in the same manner as described in Example 1. Both the emission luminance and the emission color of the ZnS:Cu,Al phosphor constituting the fluorescent screen of the color TV CRT obtained were essentially the same as those of the ZnS:Cu,Al phosphor before the preparation of the fluorescent screen.

We claim:

1. A cathode ray tube having a fluorescent screen including, as a green light emission component, a phosphor consisting essentially of a copper and aluminium activated zinc sulfide phosphor, the amount of said copper being within the range of $4 \times 10^{-4}$ to $3 \times 10^{-3}$ grams per 1 gram of said zinc sulfide, the emission color point of said phosphor lying within a yellowish green region in the color coordinates of CIE color system represented by values x and y ranging from 0.300 to 0.370 and 0.570 to 0.630, respectively, the color point of the body color of said phosphor lying within a yellow region in the color coordinates of CIE color system represented by values x and y ranging from 0.380 to 0.400 and 0.390 to 0.440, respectively, and the mean reflectance in the visible spectrum region of said phosphor being not less than 75% when the mean reflectance of a magnesium oxide diffusion plate is defined to be 100%.

* * * * *